US012783540B1

(12) United States Patent
Kajjam et al.

(10) Patent No.: US 12,783,540 B1
(45) Date of Patent: Nov. 3, 2026

(54) MECHANISMS FOR SCALING EXTRACT TRANSFORM LOAD CODE GENERATION

(71) Applicant: Amazon Technologies, Inc., Seattle, WA (US)

(72) Inventors: Venkata Narasimha Vishal Narasimha Kajjam, Summit, NJ (US); Bo Li, Kirkland, WA (US); Japson Jeyasekaran, Dublin, CA (US); Mayura Patwardhan, Brooklyn, NY (US); XiaoRun Yu, Sunnyvale, CA (US); Mukul Ranjan Prasad, San Jose, CA (US); Savio Stephen Dsouza, Long Island City, NY (US); Mohit Saxena, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/096,430

(22) Filed: Mar. 31, 2025

(51) Int. Cl.
*G06F 16/25* (2019.01)
*G06F 16/901* (2019.01)

(52) U.S. Cl.
CPC ........ *G06F 16/254* (2019.01); *G06F 16/9024* (2019.01)

(58) Field of Classification Search
CPC ........................... G06F 16/254; G06F 16/9024
See application file for complete search history.

(56) References Cited

U.S. PATENT DOCUMENTS

| | | | |
|---|---|---|---|
| 9,547,702 | B2 | 1/2017 | Vilakkumadathil |
| 11,797,558 | B2 | 10/2023 | Shah et al. |
| 12,298,995 | B1 * | 5/2025 | Möller .................. G06F 16/254 |
| 2017/0046409 | A1 * | 2/2017 | Bender ............... G06F 16/2455 |
| 2017/0220654 | A1 * | 8/2017 | De ......................... G06F 16/254 |
| 2021/0004383 | A1 | 1/2021 | Venkatasubramanian et al. |
| 2022/0043826 | A1 * | 2/2022 | Zorin ..................... G06F 16/254 |
| 2024/0320234 | A1 * | 9/2024 | Ren ........................ G06F 16/254 |
| 2025/0045027 | A1 | 2/2025 | Ngiam et al. |
| 2025/0165231 | A1 * | 5/2025 | Gaur .......................... G06F 8/35 |
| 2026/0161640 | A1 * | 6/2026 | Habara ............... G06F 16/2425 |

* cited by examiner

*Primary Examiner* — Richard L Bowen
(74) *Attorney, Agent, or Firm* — S. Scott Foster; Kowert, Hood, Munyon, Rankin & Goetzel, P.C.

(57) ABSTRACT

Systems and methods for graph-based Extract Transform Load (ETL) code generation are disclosed. A natural language request to create ETL code according to a description of the ETL code in the natural language request may be received. A graph representation of the ETL code may be generated that includes nodes corresponding to operations to obtain data from data sources, perform transformations to at least the portion of the data, and store the data in destinations. To create the graph representation, interactions with a generative machine learning model may identify the operations for the ETL code in the description in the natural language request and construct the graph representation that includes the nodes corresponding to the operations along with connections between the nodes identified according to the description in the natural language request. A response to the natural language request may be provided via the interface based on the graph representation.

20 Claims, 10 Drawing Sheets

MECHANISMS FOR SCALING EXTRACT TRANSFORM LOAD CODE GENERATION

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by extracting, transforming, and loading data into different data storage or analysis systems or performing other computational jobs.

Figure 1:
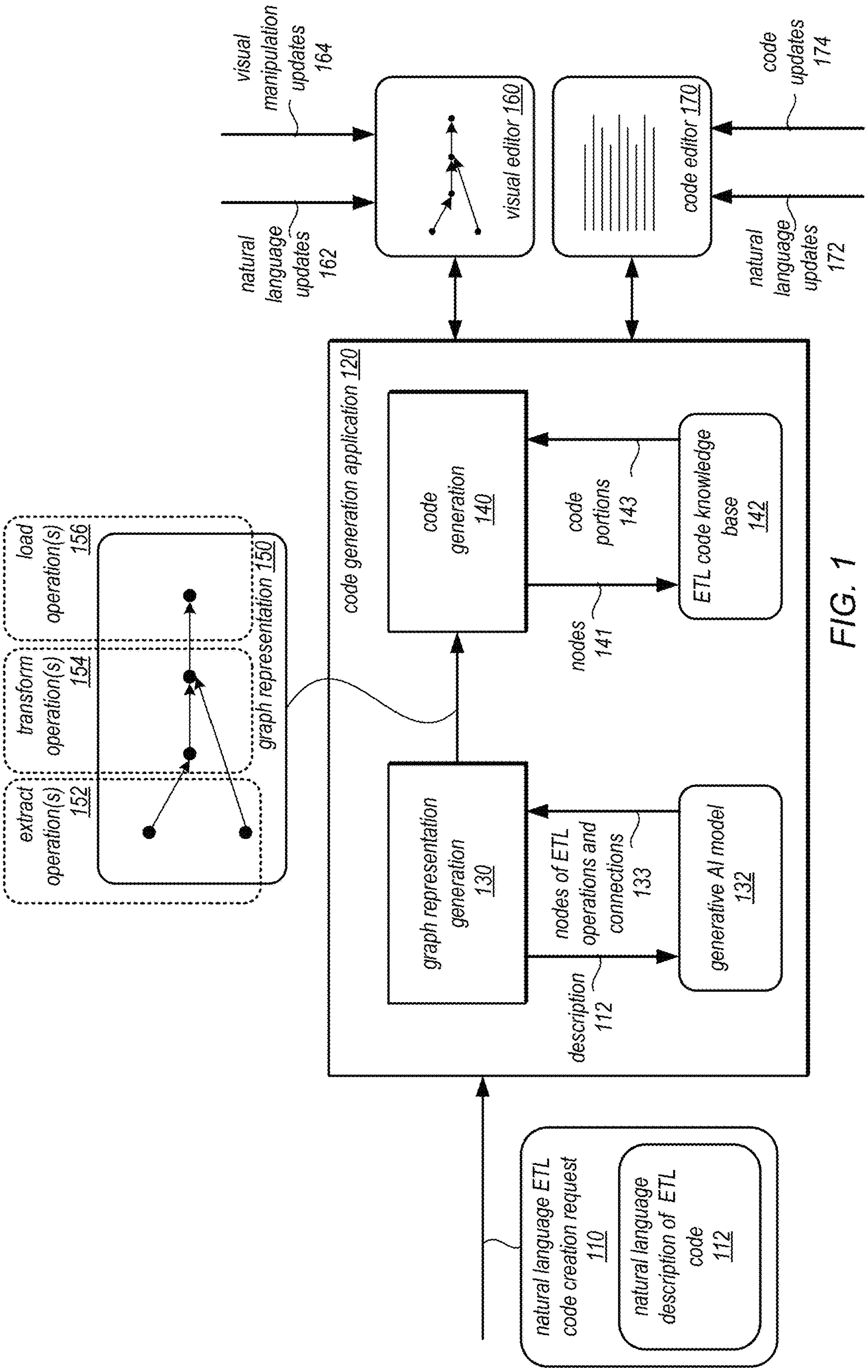
FIG. 1 illustrates a logical block diagram of a code generation application that implements mechanisms for scaling Extract Transform Load (ETL) code generation, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Techniques and methods of mechanisms for scaling Extract Transform Load (ETL) code generation are described herein. Some code generation tools using generative artificial intelligence (AI)/machine learning models, like Large Language Models (LLMs), generate code directly from natural language prompts. However, the non-deterministic nature of generative AI models, generates code with varying results (e.g., with either natural variance in output code that is not complete, missing portions as a result of information that was not included in training data and therefore will not be included in generated code, and/or "hallucinations" which refer to unlikely predictions that are perceived to be an "error" or otherwise incorrect (e.g., factually) with respect to a given prompt), which for use cases like ETL makes directly generated code unlikely to be useable without significant debugging or editing.

Enterprise code-generation tools (e.g., systems, services, or applications) may be used by thousands of developers to generate millions of lines of code for a system, service, or application, including an ETL pipeline, workflow, dataflow, or other sequence of ETL operations. Such large scale development efforts are significantly impeded when generated code includes a significant number of errors or other incomplete portions that make the code unusable. Similarly, with the rise of AI agent systems, where one AI agent (e.g., implemented by a the execution of a workflow and an LLM to perform a sequence of development tasks) uses an enterprise code-generation tool in order to perform development tasks on behalf users, the AI agent may be incapable of completing a development task that involves ETL code generation if the generated code includes a significant number of errors or other incomplete portions. However, as discussed in detail below, mechanisms for scaling ETL code generation, can significantly increase the amount of ETL code that can be generated when enterprise code-generation tools implement mechanisms for scaling ETL code generation. In this way, significant portions of ETL code can be generated using AI techniques with minimal errors.

For instance, because ETL code follows a directed data flow (e.g., from source(s), with transformation(s), to target(s) according to a particular order of operations), techniques for generating ETL from a natural language prompt that uses a graph representation (e.g., a Directed Acyclic Graph (DAG)) created from the natural language prompt by a generative machine learning model can be implemented to scale up the amount of ETL code that is generated using the generative machine learning model. As the graph representation constrains the generative machine learning model to more explicitly follow an ordered sequence of operations described in the natural language prompt, code that is subsequently generated based on the graph representation will conform to a desired data flow, ensuring both correctness and repeatable results. Increasing correctness and repeatability allows for implementations of these techniques to scale up the amount of ETL code that can be generated automatically. For example, enterprise code generation tools can incorporate ETL code generate features as part of larger development projects with confidence, reducing the number of errors and thus reducing time to implement and deploy new software applications. Similarly, agent-based code development systems can generate new system, service, or application code with significantly less developer intervention, allowing these AI-powered development systems to perform for longer periods without disruption or down time (e.g., 5 working day development cycle can be shrunk to 24 or 48 hours as AI-powered development systems can work continuously on a project until completion).

Moreover, code generation techniques that utilize generative AI models can be significantly improved as the accuracy of generated code will be useable to perform ETL tasks across many different data sources, transformations, and destinations. For example, code generation times can be reduced as graph representation generation and code generation stages can be performed with minimal or no intervention, allowing for the implementation of AI agent to AI agent systems that can produce reliable code in less time, as well as using less processing resources (e.g., as generative AI model use may be limited to graph representation instead of code generation directly). Accordingly, mechanisms for scaling ETL code generation techniques may improve the performance of code generation tools, systems, services, or applications, as well as computer-related technologies more generally.

FIG. 1 illustrates a logical block diagram of a code generation application that implements mechanisms for scaling Extract Transform Load (ETL) code generation, according to some embodiments. Code generation application 120 may generate ETL code to perform ETL pipelines, ETL workflows, ETL dataflows, or ETL jobs. Code generation application 120 may be implemented as a tool, feature, or standalone application, in some embodiments. Code generation application 120 may be implemented as part of a cloud-based service or other service provider that provides cloud-hosted tools, services, applications, or features to generate ETL code or perform ETL code, in some embodiments. Code generation application 120 may generate various other types of code for other uses cases in addition to ETL code (not illustrated), in some embodiments.

In various embodiments, ETL code may include various combinations or orderings of extract, transform, and/or load operations. Various different types of extract operations may be performed, including reading or accessing data storage locations, receiving or listening for data proactively delivered from a data source, and/or another technique for obtaining data to process, among others. Various different types of transformation operations may be performed, including operations that reformat, modify, retype, convert, combine, split, remove, filter partially or completely, generative new data derived from data obtained as part of an extract operation, among other transformation operations. Various different types of load operations may be performed, including operations that write, insert, update, submit, post, send, or otherwise provide data to a destination (e.g., a target location), among others. In at least one embodiment, ETL code may include an order of operations that performs load operations before transform operations, implementing an "ELT" data flow, workflow, pipeline, or other sequence of operations. ETL code may work with various data delivery cadences, formats, or other inputs (or outputs) of data, in various embodiments. For example, ETL code may operate on "batches" of data that include a set of data extracted at one time. In another example, ETL code may operate on a stream of data that is delivered in streaming fashion (e.g., continuously providing data items, such as records, for processing from one or more data sources, or at various other frequencies, whether consistent (e.g., periodic) or inconsistent (e.g., aperiodic).

Code generation application 120 may implement an interface (e.g., text, command line, speech, etc.) which may receive a natural language ETL code request request 110. Natural language ETL code creation request 110 may include a natural language description of ETL code 112. For example, natural language description of ETL code 112 may identify data sources of data to be read, accessed, and/or otherwise extracted from, transformations to be applied to or performed using extracted data, and destinations in which extracted and/or transformed data is to be stored.

Code generation application 120 may implement graph representation generation 130. Graph representation generation 130 may create a graph representation, such as graph representation 150, in order to deterministically describe operations within ETL code according to an order in which the operations should be performed. For example, nodes of a graph representations may correspond to different respective extract, transform, or load operations, and connections between the nodes (e.g., edges) may indicate the order of the operations (e.g., using a directed edge that leads in one direction from one node to another). In this way, graph representations can act as guide to subsequent code generation tasks in order to prevent the inherent variances (or hallucinations) that occur using generative AI model's output, such as generative AI model 132, from creating erroneous or incompatible ETL code.

Graph representation generation 130 may through one (or more) interactions provide natural language description of ETL code 112 to generative AI model 132 in order to obtain the components of graph representations, such as nodes that corresponding to different classes of ETL operations (e.g., extract 152, transform 154, or load 156), and their respective connections indicating ordering, input/output, relationships, or other representations of dataflow when executing the ETL code, as indicated at 122. A prompt, such as an example prompt discussed below, may be provided to indicate expected graph structure, potential operations, and/or other expected information to be included in a graph (and in some embodiments, examples) in order to instruct generative AI model 132 how to use description 112 to generate nodes of ETL operations and connections 133. In some embodiments, graph representation generation 130 may implement various pre and/or post processing techniques when generating graph representations. For example, as discussed in detail below with regard to FIG. 4, these pre and/or post processing techniques may, among other tasks, check for personally identifying information (PII), sensitive/high-security information, entity resolution (to identify which sources, transformations, and destinations are referenced), and verify correctness of graph representations (e.g., using other AI or machine learning models and/or rules-based analysis of graph representations).

Various different types of generative AI models 132 may be utilized. For example, in some embodiments, transformer-based models that utilize transformer stages or blocks to predict sequences of information (e.g., data represented as tokens) may be used, including, but not limited to, Large Language Models (LLMs) and Vision Language Models (VLMs). In some embodiments, generative AI model 132 may be a Foundation Model, trained across a very large amount of training data across knowledge disciplines, domains, and/or other information. In some embodiments, generative AI model 132 may be trained (or fine-tuned) specifically to code generation tasks and/or ETL code generation tasks specifically.

Graph representations, such as graph representation 150, may serve as an intermediate representation and/or a final representation for ETL code. For example, in some embodiments, graph representations may be used to generate a visual graph representation that is displayed via visual editor 160. Visual editor 160 may be implemented as part of code generation application 120, or separately. Visual editor 160 may support different interactions to manipulate the graph representation, such as visual manipulation updates 164, which may include various user interface controls to drag, drop, move, click, reorient, stack, or otherwise change a graph representation, including adding/removing nodes (which may correspond to extract, transform, or load operations), adding/removing/modifying connections, or making any other changes to graph representation to effect generated ETL code. In some embodiments, visual editor 160 may support natural language updates 162 to describe changes to make to a graph representation which may be processed similar to the techniques with graph representation generation 130 (but may also include a current graph representation as a starting point for analysis of the description 112, such as include a current graph representation in a prompt to generative AI model 132).

Code generation application 120 may implement code generation 140. Code generation 140 may use a graph representation to retrieve code portions 143 from an ETL code knowledge base 142, using nodes 141 in the graph representation. Code generation 140 may then use connections specified in the graph representation in order to complete construction of the ETL code. As discussed in detail with regard to FIG. 10 below, code portions may be parameterized allowing for parameters to be completed using connections between nodes (e.g., data source A as is the input parameters for transformation A). In various embodiments, ETL code knowledge base 142 may be one or more databases, other indexed data stores, or other knowledge repositories, that allow for retrieval of code portions identified by particular sub-classes of extract, transform, and/or load nodes (e.g., extract code portions for data source A may be different than extract code portions for data source B) in graph representations.

Code editor 170 may be implemented as part of code generation application 120, or separately. Code editor 170 may support different interactions to edit ETL code directly, such as text editing user interface elements, for making any changes to generated ETL code. In some embodiments, code editor 170 may support natural language updates 172 to describe changes to make to code which may be processed similar to the techniques with graph representation generation 130 (but may also include a current graph representation as a starting point for analysis of the description 112, such as include a current graph representation in a prompt to generative AI model 132).

In some embodiments, natural language request and updates may support many different features for code generation application 120 not illustrated in FIG. 1. For example, updates received via different editors may be stored as part of context information (or other history information) that can be used in subsequent code creation or update requests received as part of a same session, project, file, or other delimiter of interaction between developer(s) of ETL code. For example, in some embodiments, code generation application 120 may be implemented using a chatbot or agent-style development session, where developers are prompted to submit a sequence of different natural language interactions, including the code creation request 110 and/or updates 162 or 172. In such embodiments, context may be provided to generative AI model (or to other models, such as other LLMs that implement a chatbot/agent to interface with a developer to handle a development workflow other set of tasks to create ETL code. In some embodiments, updates to a graph representation (or ETL code) can be used to indicate changes to natural language descriptions that would have resulted in the updated graph representation (or ETL code) so that developers can learn how to better prompt (or at least understand) how to achieve various ETL code.

Please note that the previous description of mechanisms for scaling ETL code generation is a logical illustration and thus is not to be construed as limiting as to various other embodiments, such as various other systems, services, or applications which may implement mechanisms for scaling ETL code generation.

This specification continues with a general description of a provider network that implements an ETL service that identifies, transforms, and moves data stored in the provider network or in external data stores. Then various examples of the ETL service including different components, or arrangements of components that may be employed as part of implementing the ETL service are discussed that implement mechanisms for scaling ETL code generation. A number of different methods and techniques to implement mechanisms for scaling ETL code generation are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
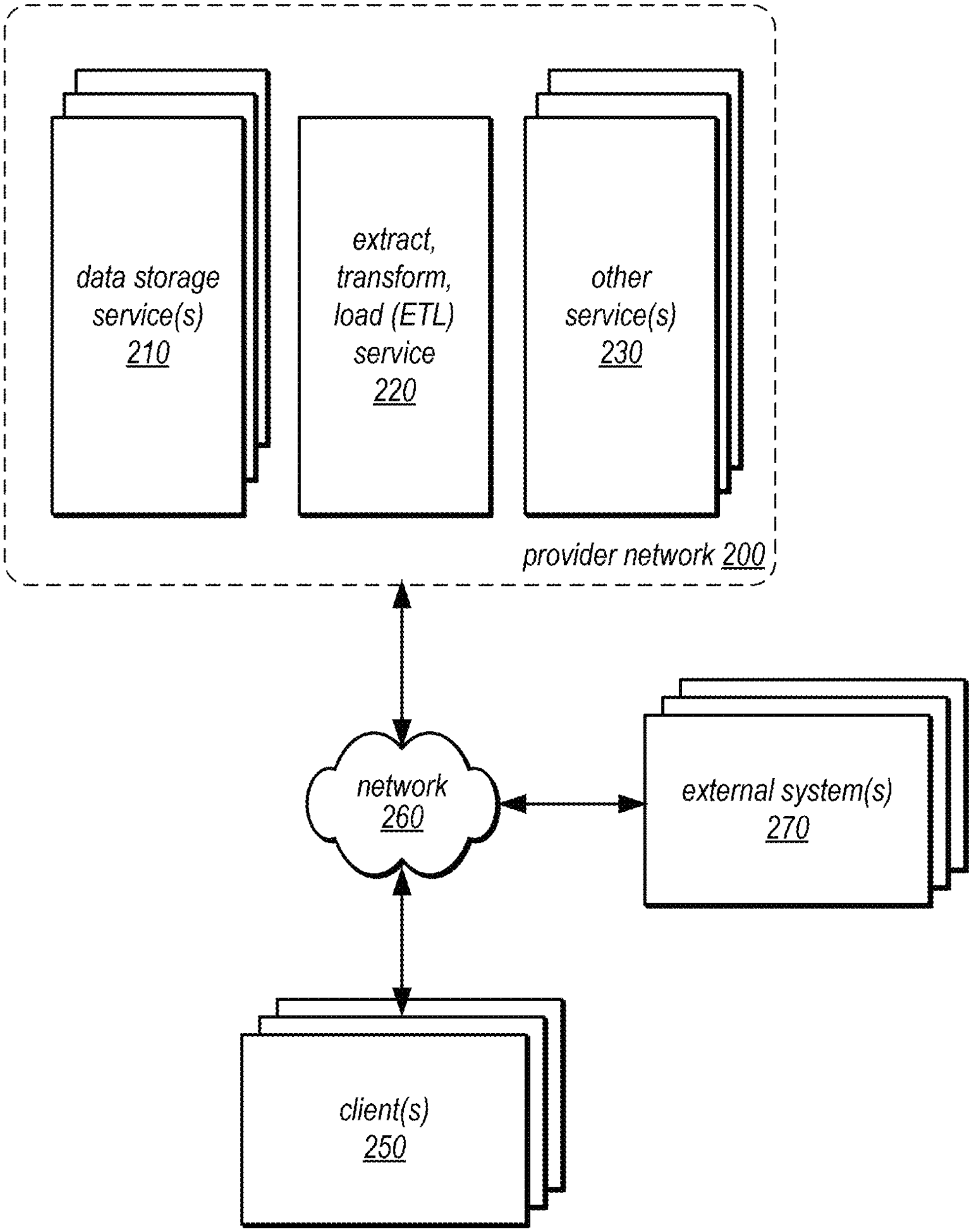
FIG. 2 is a logical block diagram illustrating a provider network offering different services including an ETL service, according to some embodiments.

FIG. 2 is a logical block diagram illustrating a provider network offering different services including an extract, transform, load (ETL) service, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 300 may deliver content from points of presence outside of, but networked with, these regions by way of edge locations and regional edge cache servers. This compartmentalization and geographic distribution of computing hardware enables the provider network 300 to provide low-latency resource access to customers on a global scale with a high degree of fault tolerance and stability.

Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), machine learning services, including services that may host various machine learning and/or AI models utilized by other services of provider network 200 and/or client(s) 250, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, ETL service 220 may provide clients with the resources to create, maintain, and orchestrate data loading jobs that take one or more data sets, perform various transformation operations, and store the transformed data for further processing (e.g., by one or more of data processing service(s)). ETL service 220 may access a data catalog generated by ETL service 220 in order to perform an ETL operation (e.g., a job to convert a data object from one file type into one or more other data objects of a different file type).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture. Although clients 250 are illustrated as external to provider network 200, in some embodiments clients of different services, like ETL service 220, can be implemented within provider network 200 (e.g., implemented on a resource of other service(s) 230, such as virtual compute instance).

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, one or more external system(s) 270 may be accessible via network 260 to act, for example, as data sources, transformation operation performers, and/or destinations for data as part of executing ETL code for ETL jobs.

Figure 3:
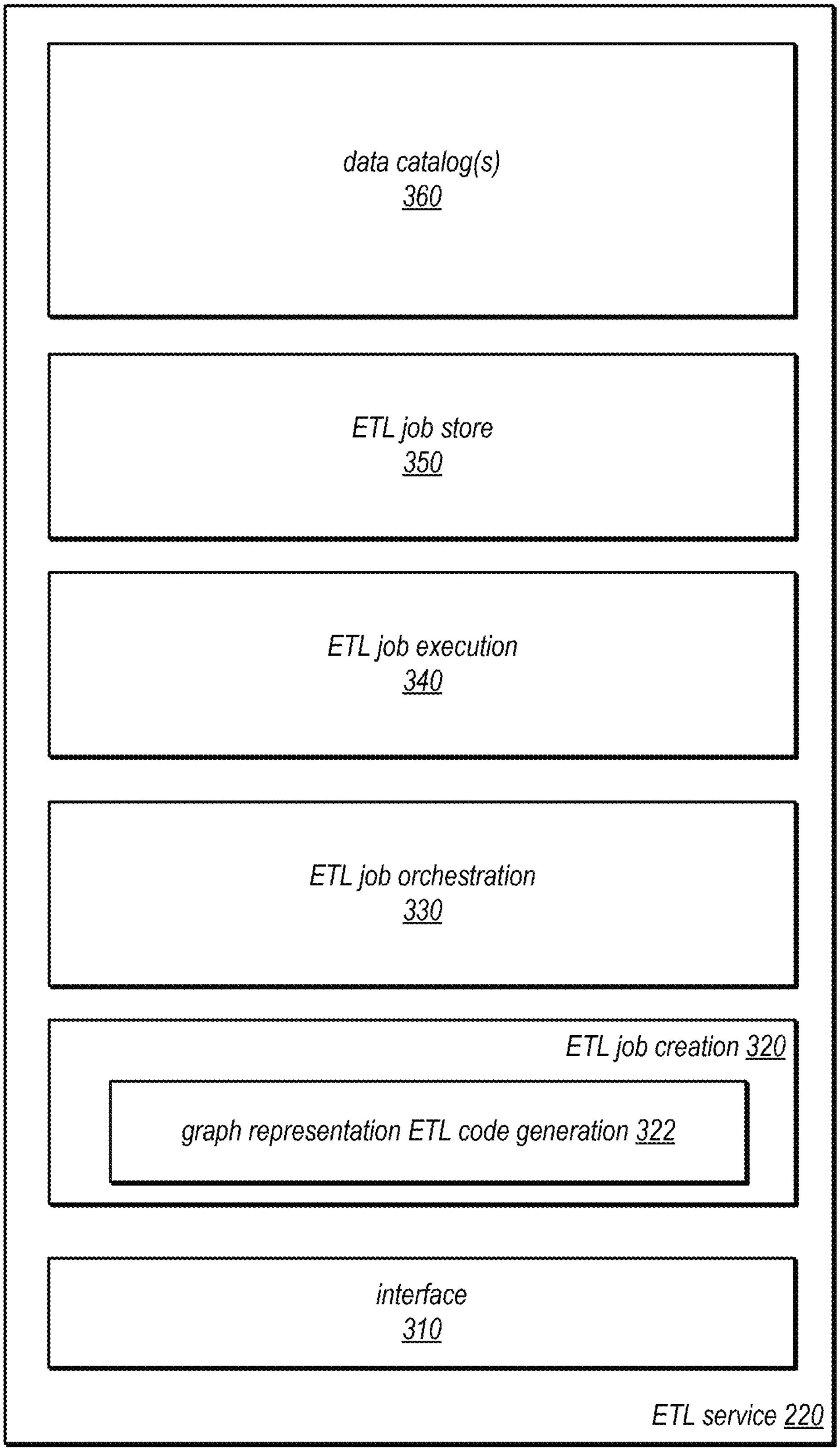
FIG. 3 is a logical block diagram illustrating an ETL service that implements mechanisms for scaling ETL code generation, according to some embodiments.

FIG. 3 is a logical block diagram illustrating an ETL service that implements mechanisms for scaling ETL code generation, according to some embodiments. ETL service 220 may provide access to data catalogs 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation, using graph representation ETL code generation 322 for natural language creation requests. ETL job creation 320 may handle requests for automated ETL job creation and manual ETL job creation. For example, ETL job creation 320 may receive job generation request which may specify the data object and target data format for the ETL job. Other job information, such as access credentials, triggering events, or any other information to execute the ETL job may be included as part of the creation request or as part of a trigger event registration request. ETL job creation 320 may determine the source data format of the data object and the target data format of the data object. For example, in one embodiment, the source and target data formats from data catalog 360 may be used. In another embodiment, data format identification may perform data format recognition techniques, or access other data stores (e.g., such as a data catalog stored in relational database) to retrieve the data format information. ETL job creation 320 may then compare the source data format and target data format or schema to select transformations to apply to the source data object to achieve the target data format. ETL job creation 320 may then generate code for selected transformations and construct the source code for executing the selected transformations. The code for the ETL job may be stored in ETL job store 350 for subsequent execution.

ETL job creation 320 may also implement manual creation of ETL jobs. For example, transformation operations may be manually selected, combined, or assembled via graphical user interface to define a workflow of transformations to apply. Code corresponding to the workflow may be generated (or supplied by a user), edited, and stored for subsequent execution as part of ETL job store 350.

ETL service 220 may implement ETL job management 330 to provide clients with the ability to manage, edit, delete, or otherwise change ETL jobs. Trigger events, may also be defined for ETL jobs. ETL job management 330 may monitor for trigger events and request execution of ETL jobs.

ETL service 220 may implement ETL job execution 340 to provide an execution platform ETL jobs according to ETL code that describes the ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from graph representation ETL code generation 322. In some embodiments, ETL job execution 340 may execute automatically generated ETL jobs that were modified. ETL job execution 340 may execute jobs in response to detected triggering events for ETL jobs (which may be detected by ETL job management or another system or service monitoring for triggering event conditions).

ETL service 220 may maintain data catalogs 360 that describe data sets (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) 360 (e.g., requests to combine, delete, or split tables of metadata in the catalog or edit the metadata determined for a data catalog). ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) 360 may be implemented by one or more storage nodes, services, or computing devices (e.g., system 1000 discussed below with regard to FIG. 10) to provide persistent storage for data catalogs generated by data catalog service 200. Such storage nodes (or other storage components of storage for data catalog(s) 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

Figure 4:
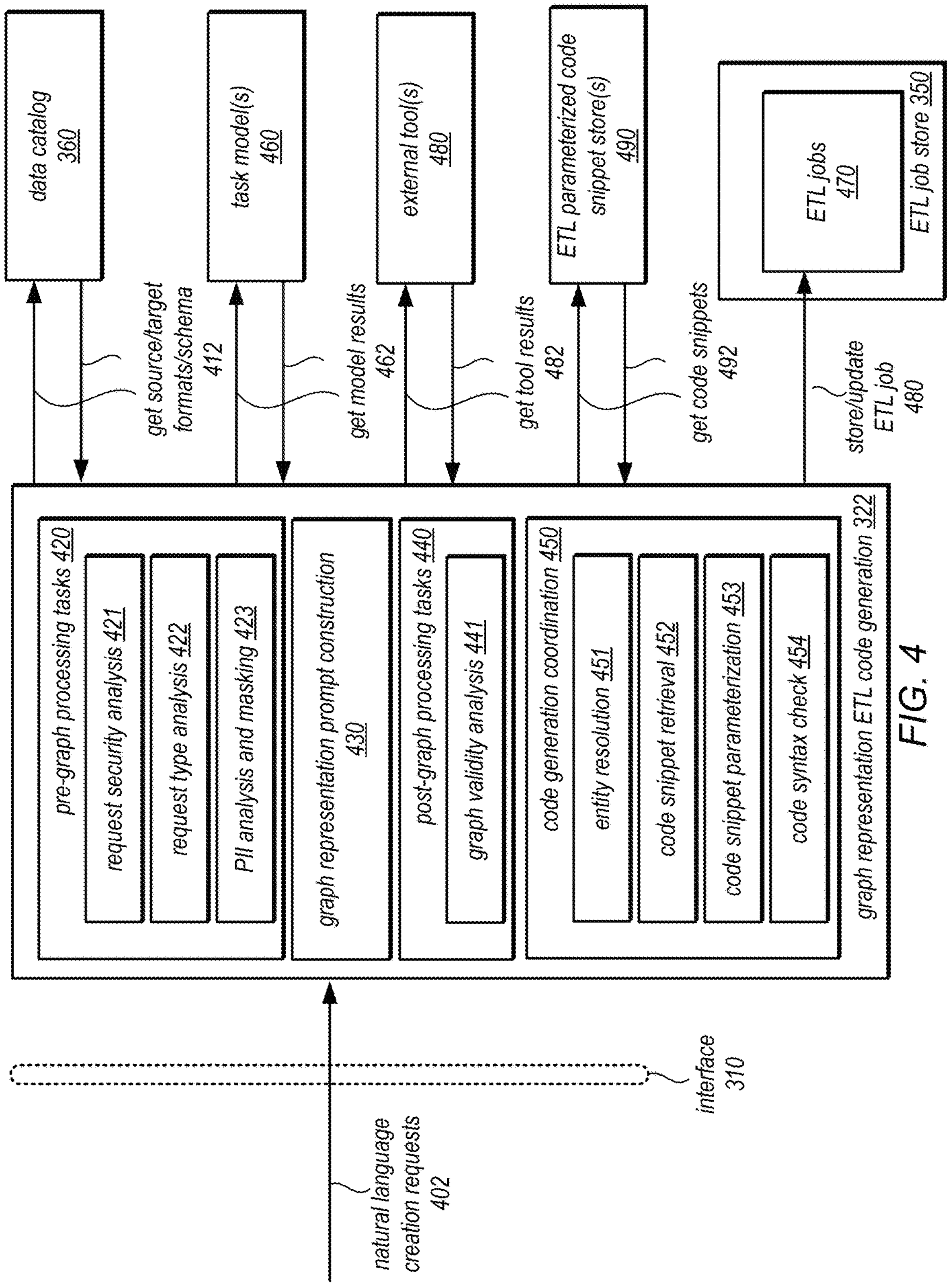
FIG. 4 is a logical block diagram illustrating mechanisms for scaling ETL code generation as part of ETL job creation, according to some embodiments.

FIG. 4 is a logical block diagram illustrating mechanisms for scaling ETL code generation as part of ETL job creation, according to some embodiments. Graph representation ETL code generation 322 may handle various requests to create and update ETL code to be executed as ETL jobs by ETL service 220. As indicated at 402, graph representation ETL code generation 322 may implement an interface 310 (e.g., a programmatic interface, such as an API) to support natural language creation requests 402 (e.g., submitted via an editor or other application).

Graph representation ETL code generation 322 may implement pre-graph processing tasks 420 in order to ensure that graph representations are properly generated to provide accurate ETL code. For example, in some embodiments, pre-graph processing tasks may include request security analysis 421. Request security analysis 421 may include features such as determining whether a request is malicious in a natural language statement (e.g., prompt hacking or model jailbreaking) in order to cause generation of results that violate ETL service 220 terms of service or otherwise cause malicious or undesirable behavior. In some embodiments, external tasks models 460 may be accessed that are specifically trained to recognize malicious prompts and indicate so in model results 462. In some embodiments, security analysis 421 may include violations of networking protocols, data safety, encryption requirements, validation authorization, or any other safety or security requirements for one or more portions of ETL code to be generated. Failure may result in an error response (not illustrated).

Another example of a pre-graph processing task 420 may be request type analysis 422. For natural language based applications, such as chat-based development sessions, some natural language inputs may not be directed to code generation tasks, but questions or other features of an application. Request type analysis 422 may determine whether, or not, a natural language statement is request creation of ETL code or something else. If something else, an error response may be generated and sent. In some embodiments, external tasks models 460 may be accessed that are specifically trained to recognize request types and indicate so in model results 462.

Another example of a pre-graph processing task may be personally identifying information (PII) analysis and masking 423. PII information may be names, social security numbers, addresses, emails, or various other identifying information that my be protected according to various laws or regulations, which may not be shared or used as part of a code generation task. PII analysis may identify and remove such information so that it cannot be used in subsequent code generation actions. In some embodiments, external tasks models 460 may be accessed that are specifically trained to recognize PII in natural language and indicate so in model results 462.

Graph representation ETL code generation 322 may implement graph representation prompt construction 430 in order to provide a generative model with examples and the natural language statement to evaluate across one or more multiple turns. One of task model(s) 460 may be a generative machine learning model prompted to identify nodes, classify nodes, and identify connections between nodes to generate a graph representation, which may be indicated in results 462 using a generative prompt.

Consider the following example prompt that may be constructed:

Given a prompt, extrapolate as many nodes as possible from the prompt and provide the list of nodes. Every node has an id, nodeType, classification, options and parentNodes. Use following instructions to answer the question above.—Do not hallucinate and only answer the question based on the context provided:

1. Classification can have following possible values: DataSource, DataSink [Destination] or Transform. If the question is only read, do not put any DataSink node in response. If the question doesn't explicitly mention any transform, do not put any Transform node in response.
2. The transform node is optional. Do not create any transform node unless the prompt declare the transforms explicitly.
3. The transform's type can be [examples of transformation operations, including, but not limited to ApplyMapping, RenameField, DropFields, SelectFields, DropNullFields, Join, Spigot, Filter, SqlCode, Union, Merge, Aggregate, DropDuplicates].

4. For datasource, the type can have following possible values: [examples of internal and external data sources].
5. For datasink, the type can be [examples of internal and external data systems].
6. When transform type is "Join", "Union" or "Merge", it only accept two parentNodes.
7. When try to Join/Union/Merge more than 2 input, we can Join/Union/Merge first 2 parentNodes first, and Join/Union/Merge the result to the 3rd input sequentially.
8. The options field is empty by default. If the node is datasource or datasink read/write from catalog table, set 'isCatalog' field as true under 'options', otherwise set 'isCatalog' field as None.
9. The response from Assistant should be of the same print format as in the Recipe examples below wrapped by double quotes.
10. If type is Object storage service, make sure add 'format' field in 'options', if no format specified from input, use json as default format.
11. The valid format for object storage service type is json, csv, parquet, avro, orc, hudi, delta, iceberg, groklog Think it step by step like the below example, only output the json in response.

Recipe:

{semantically_similar_demonstrations} prompt: {natural language input}

Various other examples or information can be provided to instruct a generative model to identify nodes, classify nodes, and identify connections between nodes to generate a graph representation. For instance, the following pseudo code provides examples to include in a graph representation prompt:

Example 0: prompt: read from object storage service as json.

Thought:

1. First, check what are the classifications of nodes included in the prompt. The prompt only asks for reading from object storage service, so there is only 1 DataSource node, No transform node or DataSink node.
2. Then, detect what's the possible types of nodes included in the prompt. The prompt mentions object storage service, therefore the type is object storage service for DataSource node. Specify the format in "options": {"format": "json"}. Specify the isCatalog in "options": {"isCatalog": {isCatalog}}.
3. Finally, infer what's the relation of the nodes. There is only one DataSource Node from the prompt.

So the output is: "[{\"id\":\"dsource1\",\"classification\": \"DataSource\", \"type\": \"OBJECT STORAGE SERVICE\", \"options\": {\"format\":\"json \"}, \"parentNodes\": [ ]}]"

Example 1: prompt: .write to

Thought:

1. First, check what are the classifications of nodes included in the prompt. The prompt only asks for writing to Data warehouse type B, so there is only 1 DataSink node, No DataSource node or Transform node.
2. Then, detect what's the possible types of nodes included in the prompt. The prompt mentions Data warehouse type B, therefore the type is Data warehouse type B for DataSink node.
3. Finally, infer what's the relation of the nodes. There is only one DataSink Node from the prompt.

So the output is: "[{\"id\": {"dsink1\", \"classification\": \"DataSink\", \"type\":\"Data warehouse type B\", \"parentNodes\": [ ]}]"

Example 2: prompt: could you demonstrate how to write data to OBJECT STORAGE SERVICE in ORC format Thought:

1. First, check what are the classifications of nodes included in the prompt. The prompt only asks for writing to object storage service, so there is only 1 DataSink node, No DataSource node or Transform node.
2. Then, detect what's the possible types of nodes included in the prompt. The prompt mentions object storage service, therefore the type is object storage service for DataSink node. Specify the format in "options": {"format": "orc"}.
3. Finally, infer what's the relation of the nodes. There is only one DataSink Node from the prompt.

So the output is: "[{\"id\":\"dsink1\", \"classification\": \"DataSink\", \"type\":\"OBJECT STORAGE SERVICE\", \"options\": {\"format\":\"orc\"}, \"parentNodes\": [ ]}]"

Example 3: prompt: give me a code block that incorporates a join transform to merge two data sources Thought:

1. First, check what are the classifications of nodes included in the prompt. The prompt only asks for using Join transform, so there is only 1 Transform node, No DataSource node or DataSink node.
2. Then, detect what's the possible types of nodes included in the prompt. The prompt mentions Join, therefore the type is Join for Transform node.
3. Finally, infer what's the relation of the nodes. There is only one Transform Node from the prompt.

So the output is: "[{\"id\":\"join\", \"classification\": \"Transform\", \"type\":\"Join\", \"parentNodes\": [\"dsource1\", \"dsource2\":[ ]}]"

Example 4: prompt: provide me a sample of code for dropnullfields transform

Thought:

1. First, check what are the classifications of nodes included in the prompt. The prompt only asks for using DropNullFields transform, so there is only 1 Transform node, No DataSource node or DataSink node.
2. Then, detect what's the possible types of nodes included in the prompt. The prompt mentions DropNullFields, therefore the type is DropNullFields for Transform node.
3. Finally, infer what's the relation of the nodes. There is only one Transform Node from the prompt.

So the output is: "[{\"id\":\"transform1\", \"classification\":\"Transform\", "type": \"DropNullFields\", \"parentNodes\": [\"dsource\"]}]"

Example 5: prompt: Could you please share a code snippet demonstrating writing data to Data warehouse type A using the data catalog Thought:

1. First, check what are the classifications of nodes included in the prompt. The prompt only asks for writing to Data warehouse type A, so there is only 1 DataSink node, No DataSource node or Transform node.

2. Then, detect what's the possible types of nodes included in the prompt. The prompt mentions Data warehouse type A, therefore the type is Data warehouse type A for DataSink node. Specify the isCatalog in "options": {"isCatalog": {isCatalog}}.
3. Finally, infer what's the relation of the nodes. There is only one DataSink Node from the prompt.

So the output is: "[{\"id\":\"dsink1\": \"classification\": \"DataSink\", \"type\":\"Data warehouse type A\":\"options\": {\"isCatalog \":\"true\"}, {"parentNodes\": [ ]}]"

Graph representation ETL code generation 322 may implement post-graph processing tasks 440, in some embodiments. For example, graph validity analysis 441 may apply one or more of the rules to check that valid data sources, transformations, destinations, and connections (e.g., no cycles) are included in the graph representation.

Figure 9:
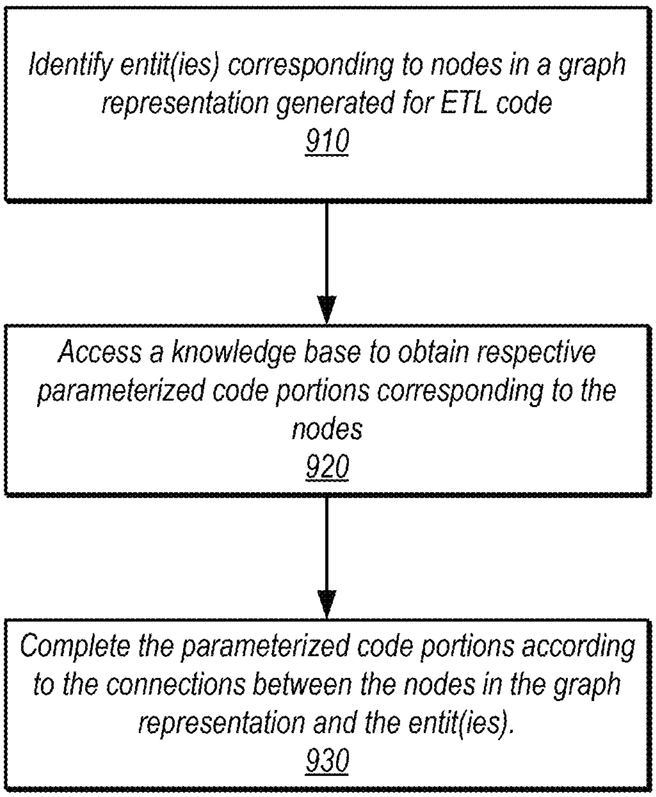
FIG. 9 is a high-level flowchart illustrating various methods and techniques to implement deterministic ETL code generation using a mechanisms for scaling, according to some embodiments.

Code generation coordination 450 may implement various techniques discussed below with regard to FIG. 9. Code generation 451 may implement entity resolution 451, and may use, for example data catalog 360 to identify entities as well as source/target formats/schemas, as indicated at 412. Code snippet retrieval 452 may be implemented to use nodes (and their respective information) to retrieve the correct parameterized code snippets using one or more indices, mapping information, or another information to get 492 code snippets from ETL parameterized code snippet store(s) 490. Code snippet parameterization 453 may complete parameters in retrieved code snippets using entities and connection in a graph representation. For example code snippet parameterization 453 may apply regular expression or key word searches to replace placeholder terms in parameterized code with parameters determined from other information (e.g., entity resolution 451, connections between nodes, etc.). Code syntax check 454 may evaluate code for syntax errors according to a rules-based analysis (e.g., checking for completeness of parameters, symbols, and/or various other syntax formats for a corresponding target ETL code language or platform).

In some embodiments, pre-graph processing tasks 420, post-graph processing tasks 440, and/or code generation coordination 450 may make use of one or more external tool(s) 480 in order to obtain tool results. For example, a parser or syntax checker that is language or domain specific for ETL code may be applied or a security analysis tool that checks for security policy or other security violations may be used.

Graph representation ETL code generation 322 may store 480 ETL code that is generated for ETL jobs 470 in ETL job store 350. For example, a project, account, or other storage location mapped to a user, session, or other entity for the ETL code may be accessed or used to store ETL code to be used for an ETL job.

Figure 5:
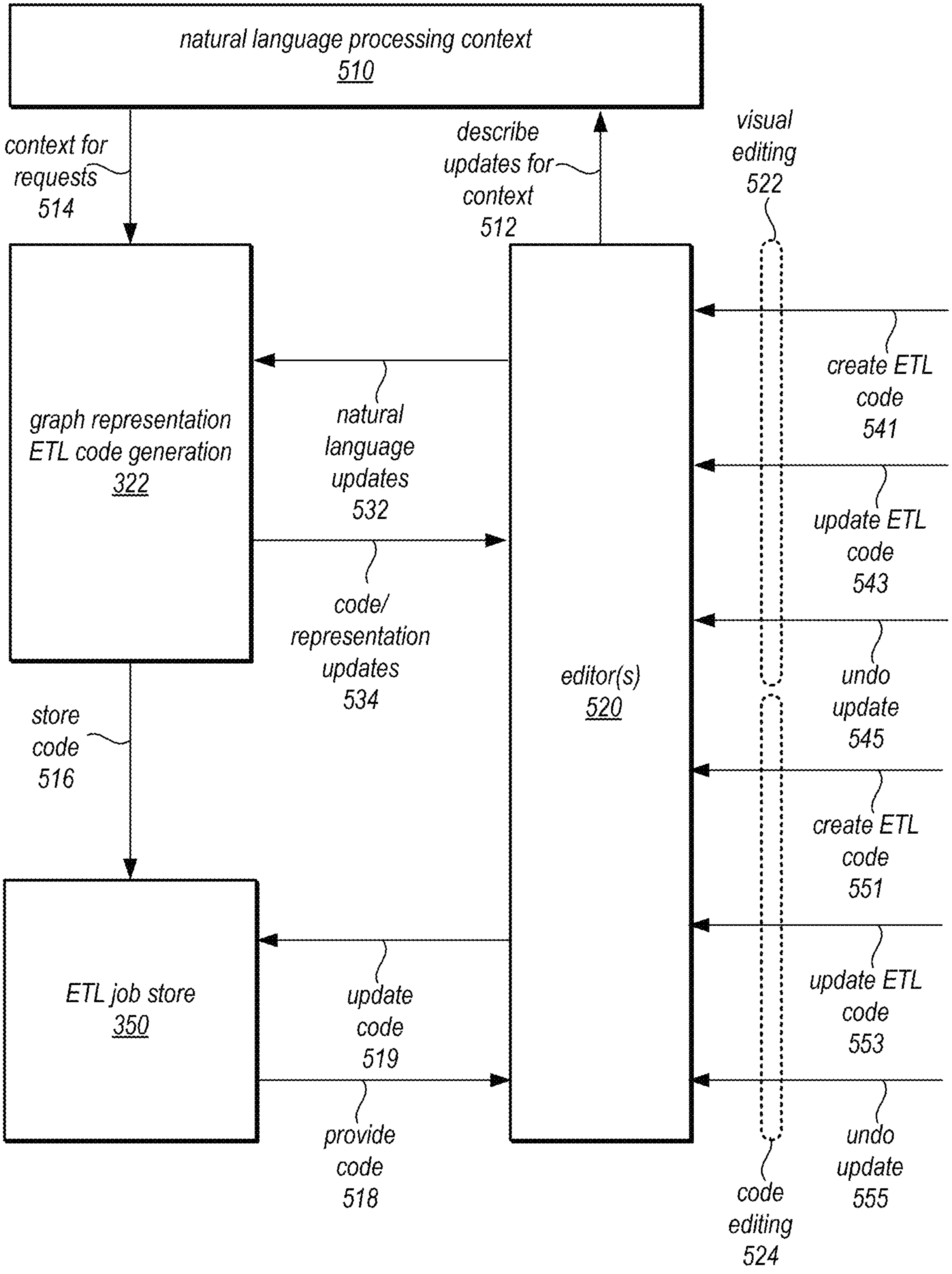
FIG. 5 is a logical block diagram illustrating interactions between an editor and ETL code generation, according to some embodiments.

FIG. 5 is a logical block diagram illustrating interactions between an editor and ETL code generation, according to some embodiments. Editor(s) 520, examples of which are discussed below with regard to FIGS. 6 and 7, may support visual editing 522 and code editing 522 for generated ETL code using techniques described above. Both visual and code editing may support corresponding actions to create ETL source code, as indicated at 541 and 551, update ETL source code, as indicated at 543 and 553, and undo updates, as indicated at 545 and 555. Such interactions may use visual manipulation, code edits directly, and/or natural language requests.

Editor(s) 520 may interact with graph representation ETL code generation 322 in order to perform natural language updates 532 (using techniques similar to those discussed above with regard to FIGS. 1 and 4). Corresponding code and/or graph representation updates may be provided, as indicated at 534. Additionally, these, and other updates, may be described and stored, as indicated at 512 as part of natural language processing context 510 for a given session, user, account, file, project, or other boundary on context 510. For example, this context may be provided, as indicated at 514, for subsequent natural language requests handled by graph representation ETL code generation 322.

Generated code may be stored, as indicated at 516 as part of ETL job store 350 and provided, when requested by editor(s) 520, as indicated at 518. Additionally, editor(s) 520 may edit code directly and update code, as indicated at 519 in ETL job store.

Figure 6:
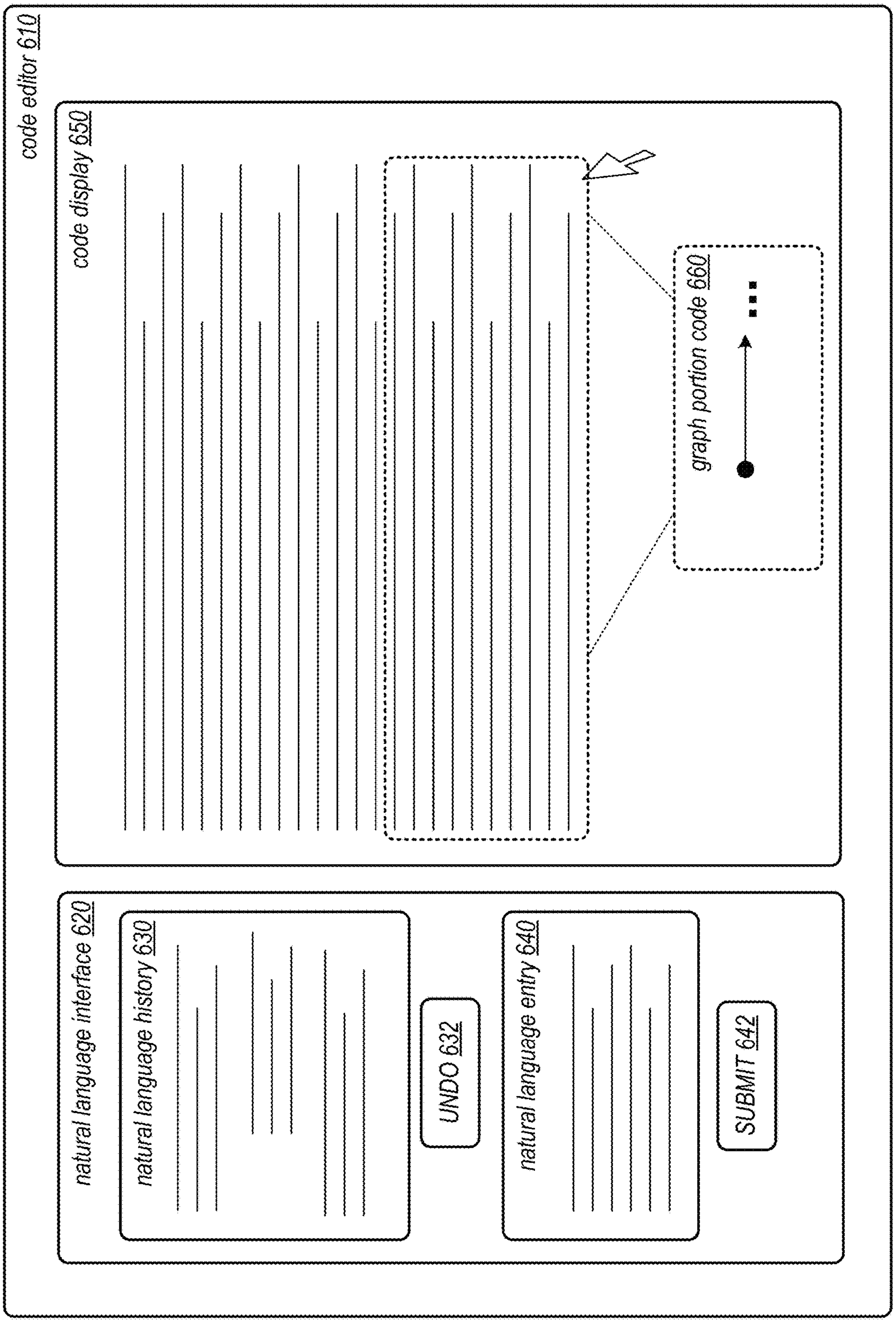
FIG. 6 is a logical block diagram illustrating an example code editor, according to some embodiments.

FIG. 6 is a logical block diagram illustrating interactions to assign and route tasks for runs of an ETL job, according to some embodiments. Code editor 610 is an example user interface which may include both a code display 650 for direct editing and selection as well as natural language interface 620. Natural language interface 620 may include a natural language history 630 of different requests and responses as well as an undo command, 632, to revert one (or more) updates made via natural language interface 620. Natural language interface 620 may also include a natural language entry element 640 to submit, 642, subsequent natural language requests for displayed code (or to create new code).

As indicated at 660, in some embodiments, portions of code may be selected. For selected portions of code, a corresponding graph portion may be displayed. In this way, a user can toggle between graph and code displays of ETL code.

Figure 7:
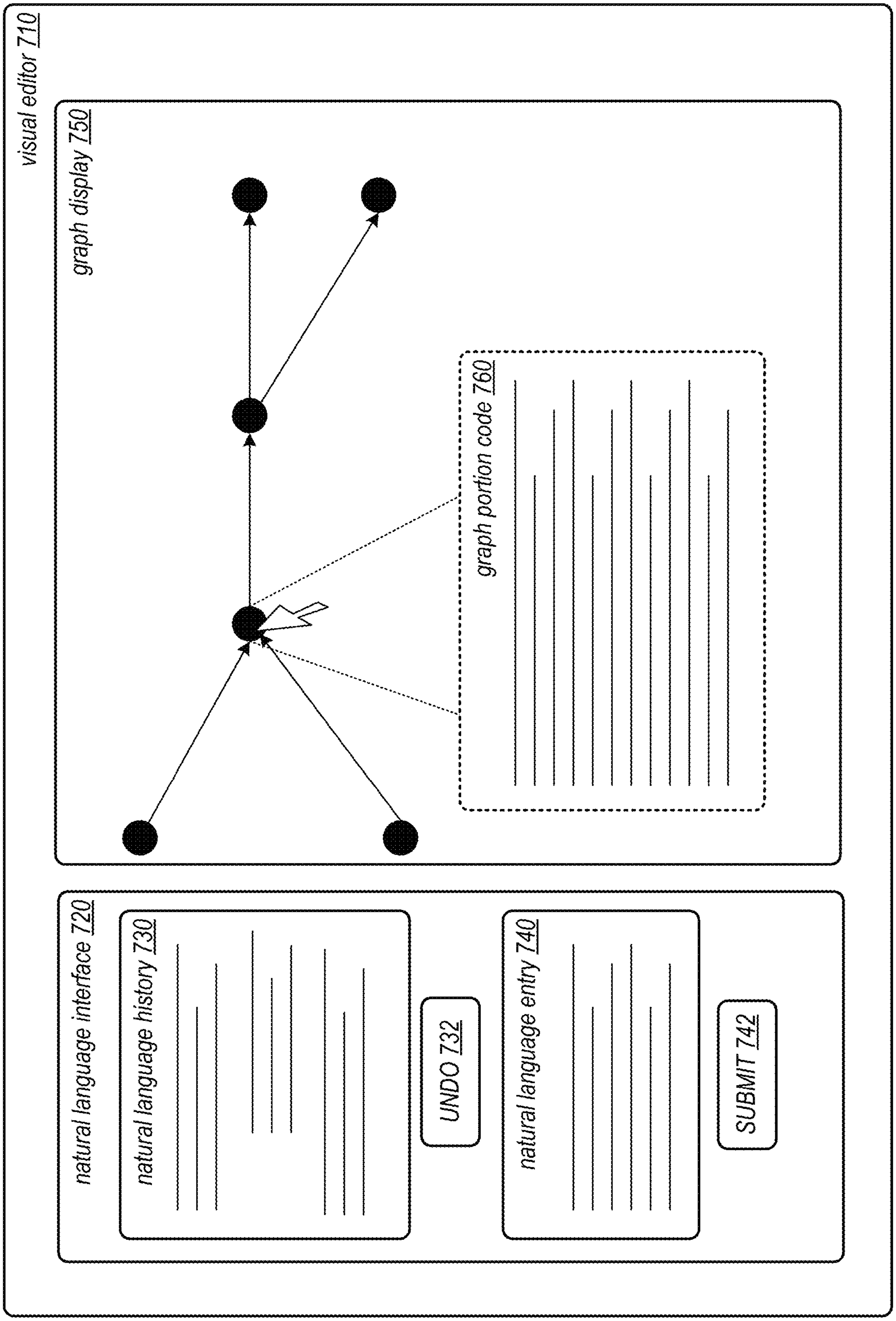
FIG. 7 is a logical block diagram illustrating an example visual editor, according to some embodiments.

FIG. 7. Visual editor 710 is an example user interface which may include both a graph display 750 for direct editing and selection as well as natural language interface 720. Natural language interface 720 may include a natural language history 730 of different requests and responses as well as an undo command 732 to revert one (or more) updates made via natural language interface 720. Natural language interface 720 may also include a natural language entry element 740 to submit, 742, subsequent natural language requests for displayed graphs (or to create new ETL code to be displayed as a graph).

As indicated at 760, in some embodiments, portions of a graph may be selected. For selected portions of the graph, a corresponding portion of code may be displayed. In this way, a user can toggle between graph and code displays of ETL code.

Although not illustrated, in some embodiments, visual and code representations similar to FIGS. 6 and 7 may have a side-by-side display style, which may allow for code and/or graph manipulations (e.g., made directly or through natural language inputs) to be synchronized (e.g., a graph change causes code to be added to a code display and/or a code change causes a change to a graph display). Such synchronization may be automatically performed in order to quickly visualize changes or edits made to ETL code or graph representations.

Although FIGS. 2-7 have been described and illustrated in the context of an ETL service, the various techniques and components illustrated and described in FIGS. 2-7 may be easily applied to other systems, applications, or network-based services that implement code generation. For example, a machine learning service or code development service that implements various code and/or development studios powered by generative AI models may implement similar techniques. As such, FIGS. 2-7 are not intended to be limiting as to other embodiments of a system that may implement mechanisms for scaling ETL code generation.

Figure 8:
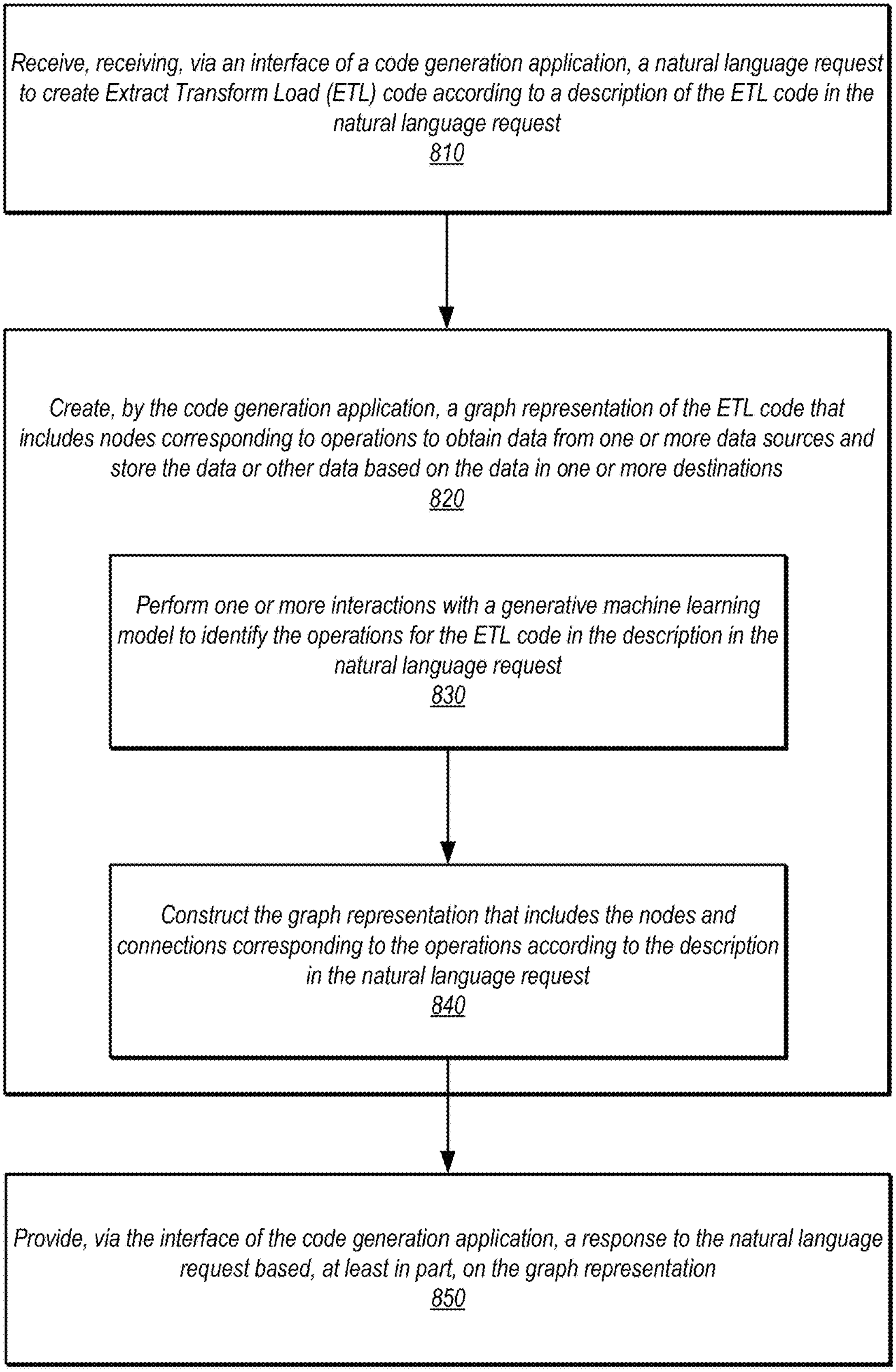
FIG. 8 is a high-level flowchart illustrating various methods and techniques to implement mechanisms for scaling ETL code generation, according to some embodiments.

FIG. 8 is a high-level flowchart illustrating various methods and techniques to implement mechanisms for scaling ETL code generation, according to some embodiments. Various different systems and devices may implement the various methods and techniques described below, either singly or working together. For example, an ETL service such as described above with regard to FIGS. 2-7 may be configured to implement the various methods. Alternatively, a combination of different systems and devices may implement the techniques below. Therefore, the above examples and or any other systems or devices referenced as performing the illustrated method, are not intended to be limiting as to other different components, modules, systems, or configurations of systems and devices.

As indicated at 810, a natural language request to create ETL code may be received (e.g., via a code generation application as discussed above with regard to FIG. 1. The natural language request may include various features, including a description of the ETL code in the natural language request. The natural language request may be specified in one (or multiple) different human languages (e.g., English, Chinese, Spanish, German, French, Hindi, etc.). The natural language request may be phrased as an instruction, question, and/or refer to previous natural language inputs (e.g., in a prior turn in a chat session). The natural language request be received as part of a single-turn or multi-turn conversion or interaction between a human (via an interface of a system) and a computer-implemented chatbot or agent (e.g., implemented using an LLM or other generative AI model that processes natural language), which may then further refine or reconstruct the natural language request for interaction with a code generation application. In some embodiments, the natural language request may be received via a text interface, command line interface, or various other interfaces that may prompt for the natural language request or provide a text entry space that can be used to submit the natural language request. In some embodiments, the natural language request may be submitted as part of a guided workflow that uses one or multiple user interface elements (e.g., windows) sequentially displayed in order to collect information to generate ETL code, including the natural language request.

In at least one embodiment, the description of the ETL code may include data source(s), including specific table names, entity names, service names, data store types, or other information that can be used to identify data sources to be accessed and data to be obtained and how the data is to be obtained. In some embodiments, natural language descriptions may include contextually relevant descriptors (e.g., "my database X") which can be resolved to a particular user, owner, or entity in order to identify data source(s). Transformation operations may be described or may not be described in the natural language description (as some ETL jobs, tasks, workflows, dataflows, pipelines, etc., may not involve transforming data but moving it to another location and/or moving it before transforming it, ELT style). Like data sources, destinations (e.g., targets at which data or transformed data is bound for storage) may be identified including specific table names, entity names, service names, data store types, or other information that can be used to identify destinations to be accessed and how the data is to be stored. In some embodiments, natural language descriptions may include contextually relevant descriptors (e.g., "my database X") which can be resolved to a particular user, owner, or entity in order to identify destination(s). An example of natural language request may be:

> I need help writing a Pyspark ETL script that reads data from storage service A as CSV, performs multiple transforms including rename fields and filter, then writes results to database B.

As indicated at 820, a graph representation may be created of the ETL code that includes nodes corresponding to operations to obtain data from one or more data sources and store the data or other data based on the data (e.g., transformed data as a result of one or more transformation operations) in one or more destinations, in some embodiments. As discussed in detail above, various pre-processing tasks may be performed to prepare to generate a graph representation. A graph representation, in at least some embodiments, may be a directed acyclic graph (DAG) which does not contain a cycle and thus flows in one direction from any node chosen as a starting point in the graph to a different terminal or ending node.

As part of creating the graph representation, one or more interactions with a generative machine learning model (e.g., an LLM) may be performed in order to prompt the generative machine learning model to identify the operations for the ETL code in the description in the natural language request. In some embodiments, examples of identification may be provided, as discussed above, as part of a prompt to the generative machine learning model. In some embodiments, the generative AI machine learning model may return nodes and node classifications (e.g., extract, transform, or load) along with sub-types or classifications (e.g., particular transform operations).

As indicated at 840, the graph representation may be constructed that includes the nodes corresponding to operations and connections according to the description in the natural language request, in some embodiments. For example, connections between nodes may be identified by the generative machine learning model. The graph representation may, in some embodiments, be specified in a script or notation format, such as JavaScript Object Notation (JSON) or other readable format that can be parsed to visually construct a graph illustration for a graph editor and can be used to generate lookup values to obtain code portions as discussed with regard to FIG. 9.

As indicated at 850, a response to the request may be provided via the interface of the code generation application based, at least in part, on the graph representation. For example, as discussed in detail above with regard to FIGS. 4-7, both visual representations and/or the ETL code itself may be returned as a result. In various embodiments, ETL code may include various the use of various scripts, programming languages (e.g., platform-specific, such as Pyspark, or general), or any other form of instruction that can be read, interpreted, compiled, executed, and/or otherwise performed to complete an ETL job, workflow, dataflow, pipeline, task, and/or process.

Code generation of the ETL code may use the graph representation to generate the ETL code deterministically. FIG. 9 is a high-level flowchart illustrating various methods and techniques to implement deterministic ETL code generation using a graph representation, according to some embodiments. As indicated at 910, one or more entities corresponding to nodes in a graph representation generated for ETL code may be identified, in some embodiments. For example, a data catalog or other index of applicable entities for a given account, user, session, project, file, dataflow, workflow, or pipeline, among other delimiting criteria for entities, may be used to resolve ambiguous or relative references to data sources, transformations, and/or destinations. Regular expression searching, vector database searching (e.g., using embeddings of portions or phrases in a natural language description), fuzzy text searching, and/or various other search techniques may be performed.

As indicated at 920, a knowledge based may be accessed to obtain respective parameterized code portions corresponding to the nodes, in some embodiments. For example, a node class/sub-class or type may be used to which code portions are to be obtained. Mapping information, an index, and/or various other code snippet lookup techniques may be implemented in order to access and obtain corresponding parameterized code portions. In some embodiments, code portions may be generated if not present in a knowledge database using a generative machine learning model (using strict prompting to avoid error introduction). Parameterized code portions may leave parameters (e.g., variables, fields, inputs, outputs, or various other information used to perform or configure performance of a code portion "empty" or filled with a placeholder that is to be replaced when the parameterized code portion is completed.

As indicated at 930, the parameterized code portions may be completed according to the connections between the nodes in the graph representation and the entities, in some embodiments. For example, connections may indicate values to be completed for input parameters and output parameters for a transformation operation. Other information, such as security credentials, data format, schema information, or various other parameters may be obtained, either from information of the graph representation or from separate information related to entit(ies) (e.g., from a catalog, security or identity authorization service, etc.).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
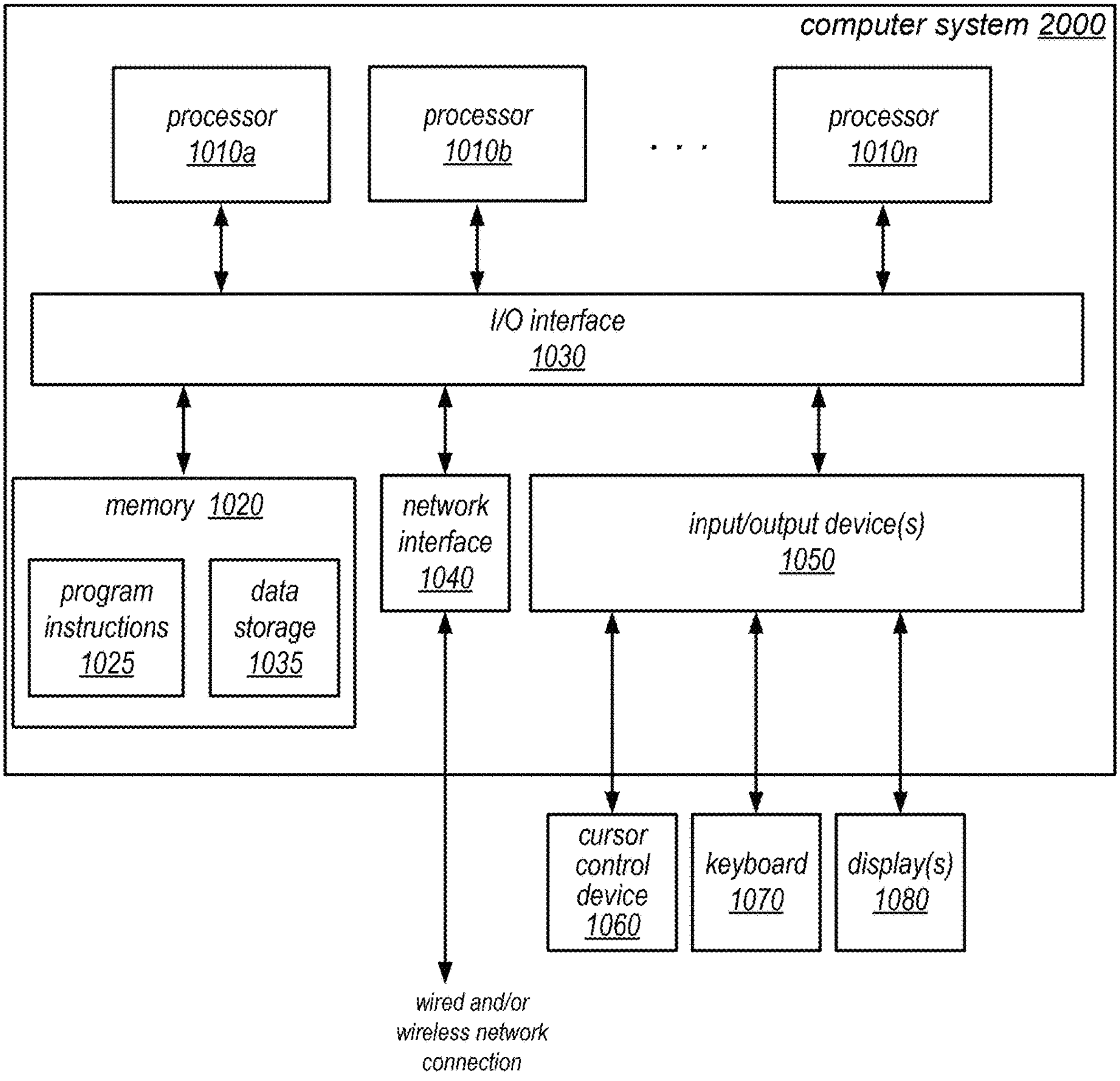
FIG. 10 illustrates an example system configured to implement the various methods, techniques, and systems described herein, according to some embodiments.

Embodiments of mechanisms for scaling ETL code generation as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more of computing devices, respectively comprising at least one processor and a memory, configured to perform an Extract Transform Load (ETL) service, the system is configured to:

receive, via an interface of the ETL service, a natural language request to create ETL code according to a description of the ETL code in the natural language request, wherein the ETL code, when executed by the ETL service, at least obtains data from one or more data sources and stores the data or transformed data, based on the data, in one or more destinations;

create a graph representation of the ETL code that includes nodes corresponding to operations to obtain the data from the one or more data sources and store the data or the transformed data, based on the data, in the one or more destinations, comprising:

perform one or more turns that prompt a Large Language Model (LLM) to:

identify ETL operations in the description of the natural language request as corresponding to one of extract, transform, or load operations; and construct the graph representation that includes the nodes and connections corresponding to the identified ETL operations; and display, via the interface of the ETL, a response to the natural language request based, at least in part, on the graph representation.

2. The system of claim 1, wherein to display the response, the ETL service displays the graph representation in a graph-based ETL code editor.

3. The system of claim 2, wherein the system is further configured to:

receive one or more inputs that causes one or more changes to the graph representation; and subsequently update the graph representation as displayed in the graph-based ETL code editor.

4. The system of claim 1, wherein to display the response to the natural language request, the system is configured to:

access a knowledge base to obtain respective parameterized code portions corresponding to the nodes;

modify the parameterized code portions according to the connections between the nodes in the graph representation to generate the ETL code; and wherein the response displays the ETL code.

5. A method, comprising:

receiving, via an interface of a code generation application, a natural language request to create Extract Transform Load (ETL) code according to an operation description in the natural language request, wherein the ETL code, when executed, at least obtains data from one or more data sources and stores the data or transformed data, based on the data, in one or more destinations;

creating, by a code generation application, a graph representation of the ETL code that includes nodes corresponding to operations to obtain the data from the one or more data sources and store the data or the transformed data, transformed based on the data, in the one or more destinations, comprising:

performing one or more interactions with a generative machine learning model to:

identify one or more ETL operations in the description of the natural language request; and construct the graph representation that includes the nodes and connections corresponding to the identified ETL operations; and providing, via the interface of the code generation application, a response to the natural language request based, at least in part, on the graph representation.

6. The method of claim 5, wherein providing the response comprises displaying the graph representation in a visual editor.

7. The method of claim 6, further comprising:

receiving one or more inputs that causes one or more changes to the graph representation; and updating the graph representation as displayed in the visual editor.

8. The method of claim 7, wherein the one or more inputs are received as one or more natural language requests to update the graph representation.

9. The method of claim 7, wherein the one or more inputs are received as one or more graphical manipulations of the graph representation specified via the visual editor.

10. The method of claim 5, wherein providing the response to the natural language request, comprises:

accessing a repository to obtain respective parameterized code portions corresponding to the nodes;

modifying the parameterized code portions according to the connections between the nodes in the graph representation to generate the ETL code; and wherein the response comprises the ETL code.

11. The method of claim 10, further comprising:

receiving, via the interface of the code generation application, one or more changes to the ETL code; and updating the graph representation according to the one or more changes to the ETL code.

12. The method of claim 5, further comprising storing a description of one or more changes that causes one or more updates to the graph representation or the ETL code to apply the description to one or more subsequent natural language requests to create additional ETL code.

13. The method of claim 5, further comprising obtaining the graph representation as part of performing a subsequent natural request that describes and update to the ETL code.

14. One or more non-transitory, computer-readable storage media, storing program instructions that when executed on or across one or more computing devices cause the one or more computing devices to perform:

receiving, via an interface of a code generation application, a natural language request to create Extract Transform Load (ETL) code according to an operation description in the natural language request, wherein the ETL code, when executed, at least obtains data from one or more data sources and stores the data or transformed data, based on the data, in one or more destinations;

creating a graph representation of the ETL code that includes nodes corresponding to operations to obtain the data from the one or more data sources and store the data or the other data based on the data in the one or more destinations, comprising:

performing one or more interactions with a generative machine learning model to:

identify one or more ETL operations in the description of the natural language request; and construct the graph representation that includes the nodes and connections corresponding to the identified ETL operations; and providing, via the interface of the code generation application, a response to the natural language request based, at least in part, on the graph representation.

15. The one or more non-transitory, computer-readable storage media of claim 14, wherein, in providing the response, the program instructions cause the one or more computing devices to implement displaying the graph representation in a graph-based code editor.

16. The one or more non-transitory, computer-readable storage media of claim 15, storing further program instructions that when executed on or across the one or more computing devices, cause the one or more computing devices to further implement:

receiving one or more inputs that causes one or more changes to the graph representation; and updating the graph representation as displayed in the graph-based code editor.

17. The one or more non-transitory, computer-readable storage media of claim 16, storing further program instructions that when executed on or across the one or more computing devices, cause the one or more computing devices to further implement storing a description of the one or more inputs that causes the one or more changes to the graph representation to apply the description to one or more subsequent natural language requests to create further ETL code.

18. The one or more non-transitory, computer-readable storage media of claim 16, wherein the one or more inputs are received as one or more natural language requests to update the graph representation.

19. The one or more non-transitory, computer-readable storage media of claim 14, wherein, in providing the response to the natural language request, the program instructions cause the one or more computing devices to implement:

accessing a knowledge repository to obtain respective parameterized code portions corresponding to the nodes;

modifying the parameterized code portions according to the connections between the nodes in the graph representation to generate the ETL code; and wherein the response comprises the ETL code.

20. The one or more non-transitory, computer-readable storage media of claim 19, storing further program instructions that when executed on or across the one or more computing devices, cause the one or more computing devices to further implement:

receiving, via the interface of the code generation application, one or more changes to the ETL code; and updating the graph representation according to the one or more changes to the ETL code.

* * * * *